US008266963B2

(12) United States Patent
Rastegar et al.

(10) Patent No.: US 8,266,963 B2
(45) Date of Patent: Sep. 18, 2012

(54) METHODS AND APPARATUS FOR INTEGRATED ENERGY HARVESTING POWER SOURCES AND INERTIAL SENSORS FOR GUN-FIRED MUNITIONS

(75) Inventors: Jahangir S. Rastegar, Stony Brook, NY (US); Thomas Spinelli, East Northport, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 423 days.

(21) Appl. No.: 12/409,446

(22) Filed: Mar. 23, 2009

(65) Prior Publication Data
US 2010/0236329 A1    Sep. 23, 2010

(51) Int. Cl.
*G01P 15/09*    (2006.01)
(52) U.S. Cl. ............... 73/514.34; 73/514.16; 73/514.01; 310/311; 102/293

(58) Field of Classification Search ............... 73/514.34; 310/311
See application file for complete search history.

(56) References Cited

U.S. PATENT DOCUMENTS

| 2003/0041767 A1* | 3/2003 | Rastegar et al. ............... 102/207 |
| 2007/0204756 A1* | 9/2007 | Rastegar et al. ............... 102/210 |

* cited by examiner

*Primary Examiner* — Lisa Caputo
*Assistant Examiner* — Roger Hernandez-Prewitt

(57) ABSTRACT

A method for generating electrical power from an acceleration of an object is provided. The method including: vibrating a mass-spring unit upon an acceleration of an object; transmitting a force resulting from the acceleration from the mass-spring unit to the one or more piezoelectric elements; converting the vibration of the mass-spring unit to an electrical energy; and calculating at least one of the force and acceleration based on an output of the one or more piezoelectric elements.

11 Claims, 4 Drawing Sheets

METHODS AND APPARATUS FOR INTEGRATED ENERGY HARVESTING POWER SOURCES AND INERTIAL SENSORS FOR GUN-FIRED MUNITIONS

BACKGROUND OF THE INVENTION

1. Field of the Invention

The present invention relates generally to power supplies, and more particularly, to power supplies for projectiles fired by gun, mortars and the like, which generate power due to an acceleration of the projectile.

2. Prior Art

All existing and future smart and guided projectiles and those with means of one-way or two-way communications with a command or tracking station or with each other require electric power for their operation. In addition, as munitions are equipped with the means of communicating their type and characteristics with the firing system to ensure that the intended round is being used and for fire control purposes, and for health monitoring and diagnostics runs before loading, they would require a low level of power supply minutes and sometimes even seconds before being loaded into the gun system. The amount of power required for the proper operation of such smart and guided munitions or those equipped with the aforementioned health monitoring and diagnostics capabilities, is dependent on their mode of operation and the on-board devices that have to be powered. The amount of power requirement is fairly small if the projectile is required to only receive a RF or other similar signal and to power sensors such as MEMs types of accelerometers and rate gyros or health monitoring and diagnostics related electronics. The power requirement is increased if the projectile is also required to communicate back to the ground or some mobile station. The power requirement, however, becomes significant when the projectile has to be equipped with electric or smart materials based actuation devices for guidance and control, particularly if the projectile is required to become highly maneuverable over long traveling times and while traveling at relatively high speeds such as supersonic speeds.

In addition, all existing and future smart and guided projectiles are preferably equipped with means for sensing one or preferably more of the firing setback and set-forward accelerations, radial accelerations, flight vibration in the longitudinal and lateral (radial) directions, and terminal point impact induced acceleration. The measurements preferably include the related acceleration profiles. The sensory information can be used for guidance and control purposes as well as for fuze safety and operation.

The mass-spring systems used in the piezoelectric based power generators described in the U.S. Pat. Nos. 7,231,874 and 7,312,557, the contents of which are incorporated herein by reference, can generally be used in the construction of the disclosed integrated power generators and inertial sensors of the present invention for gun-fired munitions.

SUMMARY OF THE INVENTION

Accordingly electrical energy generators with integrated acceleration measuring sensors are provided. The generators can use piezoelectric elements and generate electrical energy due to occurrences, such as the firing setback and set-forward accelerations, during the flight due to flight vibrations and rotary oscillations, and due to the impact shock.

Accordingly, an apparatus for generating electrical power upon an occurrence, such as the application of the firing acceleration, due to flight vibrations and rotary oscillations and due to impact shock at the terminal point of the flight is provided. The generator can use piezoelectric elements, such as in stack configurations, to convert mechanical energy stored in elastic elements due to firing accelerations, flight vibration and rotary oscillations and due to impact at the terminal point of the flight to electrical energy which can then be used directly by onboard electrical and electronics components or stored in electrical energy storage devices such as capacitors. At least three piezoelectric elements can be configured to measure acceleration in the longitudinal and two independent radial directions. More piezoelectric elements may be added to measure rotary acceleration, such as spinning acceleration inside the gun barrel for rifled barrels.

The apparatus can further comprise a mass-spring system that stores mechanical energy due to firing and impact accelerations and vibration and rotary oscillations of the projectile during the flight. The mass can be a portion of the spring element. The mass can be a separate portion from the spring and attached thereto. The mass-spring system can be attached to the projectile through the aforementioned piezoelectric elements. The stored mechanical energy causes the mass-spring system to vibrate, which exerts a cyclic force on the piezoelectric elements, generating electrical charges in the piezoelectric elements. The magnitude of the generated charge in each piezoelectric element is proportional to the amount of force being exerted on the said piezoelectric element and can be measured. The distribution of force exerted on the piezoelectric elements can then used to determine the direction of the applied accelerations to the projectile during the firing, during the flight as a result of vibration and rotary oscillations and during the impact at the terminal point of the flight.

The apparatus can further comprise means for preloading the piezoelectric material in compression. In which case, the apparatus can further comprise means for adjusting an amount of the preloading. The preloading is for the purpose of preventing the piezoelectric elements to be subjected to tensile forces during aforementioned firing accelerations, during flight vibration and rotary oscillations, and as the result of the projectile impact at the terminal point of the flight. piezoelectric ceramics must generally be protected from tensile stresses since they are highly brittle and can readily fracture with the application of a considerable amount of tensile stress.

The apparatus can further comprise a housing having an internal cavity for containing the piezoelectric member and spring element in the internal cavity. The housing can comprise means for collapsing in a direction of the acceleration to limit an amount of movement of the spring member. The apparatus can further comprise limiting means for limiting a loading on the piezoelectric member due to firing acceleration and terminal point impact. Examples of such limiting means are disclosed in the U.S. Pat. No. 7,312,557.

Also provided is an apparatus for generating an electrical power upon an acceleration of the apparatus in which the apparatus comprises: a housing; piezoelectric members positioned within the housing; a spring element disposed with the housing; and a mass configured to apply a force to the spring element which in turn applies a force to the piezoelectric materials based elements upon the acceleration. The mass can be a portion of the spring element. The piezoelectric elements can be configured to generate electrical energy by converting the mechanical energy stored in the mass-spring elements and can also function as sensors to measure linear and when desired rotary accelerations of the platform onto which the apparatus is mounted, such as a projectile.

It is noted that the disclosed power generators with integrated inertial sensors may also be used in devices that only experience high acceleration levels upon impacting certain object or medium. In such applications, the present power generators with integrated inertial sensors can be used to determine the direction of the impact and the level of impact forces that are experienced, which would also provide information as to the physical characteristics of the impacted medium (e.g., its softness, elasticity and density). The power source could then generate enough energy for onboard electronics to make appropriate decisions and initiate programmed actions.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

In the methods and apparatus disclosed herein, the spring end of a mass-spring unit is attached to a housing (support) unit via one or more piezoelectric elements, which are positioned between the spring end of the mass-spring and the housing unit. A housing is intended to mean a support structure, which partially or fully encloses the mass-spring and piezoelectric elements. On the other hand, a support unit may be positioned interior to the mass-spring and/or the piezoelectric elements or be a frame structure that is positioned interior and/or exterior to the mass-spring and/or piezoelectric elements. The assembly can be provided with the means to preload the piezoelectric element in compression such that during the operation of the power generation unit, tensile stressing of the piezoelectric element is substantially avoided. The entire assembly is in turn attached to the base structure (e.g., gun-fired munitions). When used in applications that subject the power generation unit to relatively high acceleration and/or deceleration levels, the spring of the mass-spring unit can be allowed to elongate and/or compress only within a specified limit. Once the applied acceleration and/or deceleration have substantially ended, the mass-spring unit begins to vibrate, thereby applying a cyclic force to the piezoelectric element, which in turn is used to generate electrical energy. When the base structure is a gun-fired projectile or mortar or the like or any other moving platform, that undergo vibration and oscillatory motions during the flight will also excite the mass-spring system and cause it to similarly vibrate and apply a cyclic force to the piezoelectric element, which can be similarly used to generate electrical energy. The housing structure or the base structure or both may be used to provide the limitation in the maximum elongation and/or compression of the spring of the mass-spring unit (i.e., the amplitude of vibration). Each housing unit may be used to house more than one mass-spring unit, each via at least one piezoelectric element.

In the following schematics of the various embodiments, the firing acceleration is considered to be upwards as indicated by arrow 10. The direction of radial accelerations during the firing and during the flight due to projectile vibration and rotary oscillations and at the time of impact at the terminal point of the flight on the present generators is shown by the arrow 11.

Figure 1:
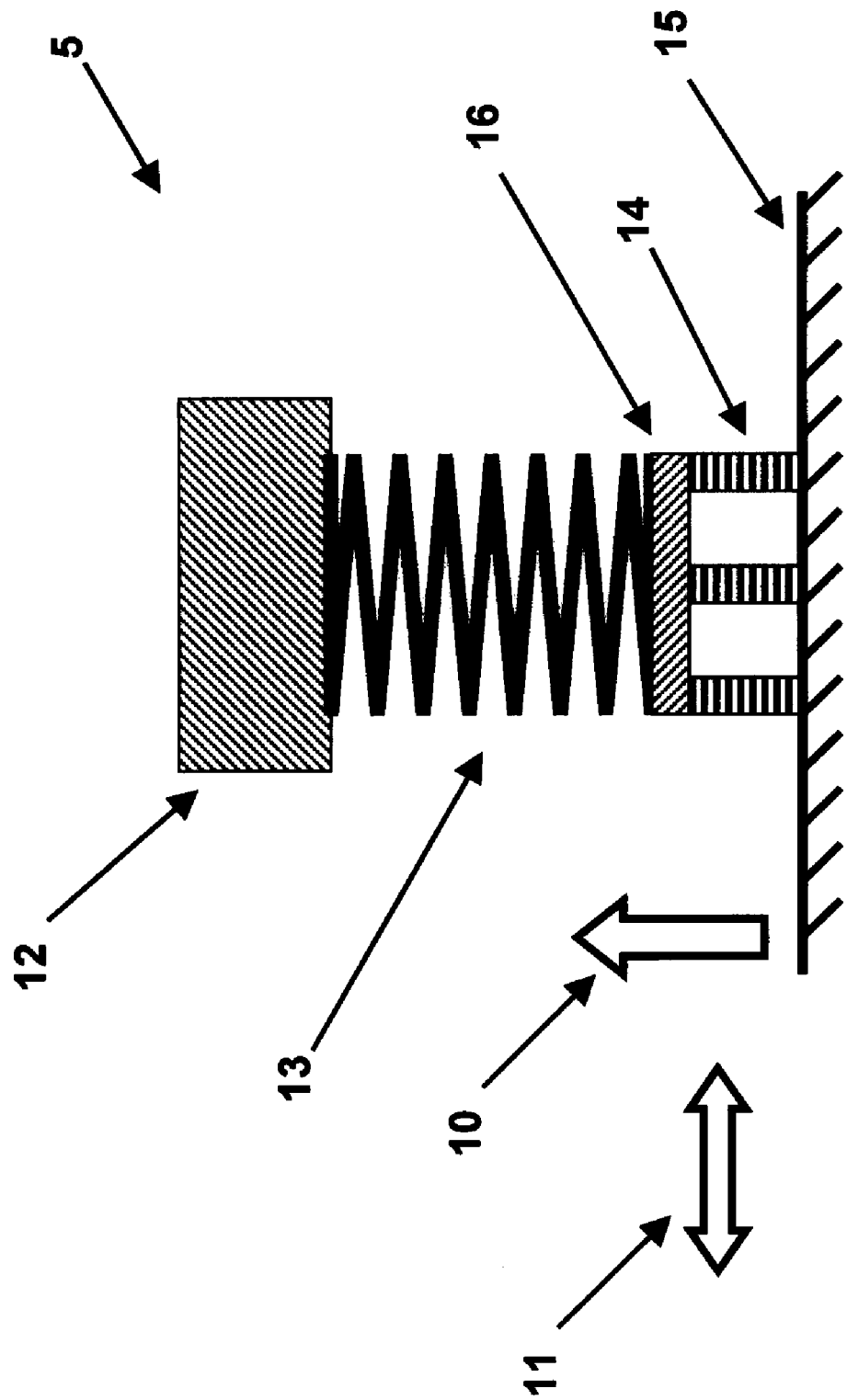
FIG. 1 illustrates a schematic of an energy harvesting power source with integrated acceleration measuring sensors.

In a first embodiment shown in the schematic drawing of FIG. 1, the power generator with integrated inertial sensors 5 is comprised of a mass-spring system consisting of a mass element 12 and spring 13. The spring element 13 is attached to the mass element 12 on one end and at least one piezoelectric element 14 on the other end. The spring element 13 is preferably attached to the piezoelectric elements via a substantially rigid element 16 to distribute the force applied by the spring more uniformly to the piezoelectric elements 14. The element 16 can be integral to the spring element 13. Similarly, the mass element 12 can be integral to the spring element 13. In their integral configurations, the element 16 and mass element 12 can be closely wound portions of a helically wound spring element 13. The spring element 13 can be made with at least 3 helical strands to minimize the tendency of the mass-spring element to displace laterally or bend to the side during longitudinal displacement and vibration in the direction of the arrow 10. The piezoelectric elements 14 are in turn attached (directly or via other substantially rigid elements (not shown) to the structure of the projectile 15.

During the firing, during the flight and during the impact at the terminal point of the flight, the projectile is subjected to axial and radial accelerations in the direction of the arrows 10 and 11, respectively, and rotary accelerations about the axial and radial directions. These linear and rotational accelerations act on the inertia of the mass element 12 and the spring element 13, thereby resulting in the application of axial forces in the direction of the arrow 10; shearing forces in the direction of the arrow 11 (and the direction normal to the arrows 10 and 11—not shown for clarity); moments about the above two shearing force directions; and a moment (torque) about the direction of the above axial force to the element 16, FIG. 1. The element 16 in turn transmits the applied axial and shearing forces and moments and torque to the underlying piezoelectric elements 14. The element 16 can be integral to the spring element 13.

In the methods disclosed herein, the level of charges (voltages) generated by the piezoelectric elements 14 as a result of the application of the aforementioned axial and shearing forces and moments and torque are measured and used to determine the level of at least one of the said applied forces, moments and torque. These measurements are made while the charges are harvested. Noting that the forces, moments and torque are proportional to the aforementioned linear and rotary accelerations that are experienced by the projectile, the levels of measured forces and/or moments and/or torque would also provide the levels of at least one of the related aforementioned linear and/or rotary accelerations.

As a result, the device 5 can function both as an energy harvesting power source and an accelerometer and/or force (moment and/or torque) sensor. Such an integrated power source and acceleration and/or force (moment and/or torque) sensor device, will significantly reduce the overall size and volume that would have been occupied by currently available and separate power source units and acceleration and force (moment and torque) sensor units. Such integrated power source and acceleration and force (moment and torque) sensor units are of particular need in applications such as gun-fired munitions, mortars and the like where such devices have to occupy minimal volume in order to allow room in the projectile for other components of the munitions that are required to make the projectile effective.

It is noted that in gun-fired munitions applications, the piezoelectric based power generators can be designed as described in the U.S. Pat. Nos. 7,231,874 and 7,312,557 so that they could withstand high firing accelerations and target impact forces that are generally experienced by gun-fired munitions, mortars and the like.

It is also noted that the use of piezoelectric materials in the construction of force (moment and torque) sensors and accelerometers is well known in the art and in fact such accelerometers are widely available commercially). In such sensors, piezoelectric elements are used with appropriate inertial elements to generate charges due to the applied accelerations, which are in turn proportional to the applied accelerations. Such devices are routinely calibrated to provide accurate force and/or moment or torque measurements and to account for force/moment/torque cross-sensitivity. Methods of converting the measured charges (voltages) and converting the information to acceleration and/or force (moment and torque) information and calibration of such sensors are also well known in the art.

Figure 2:
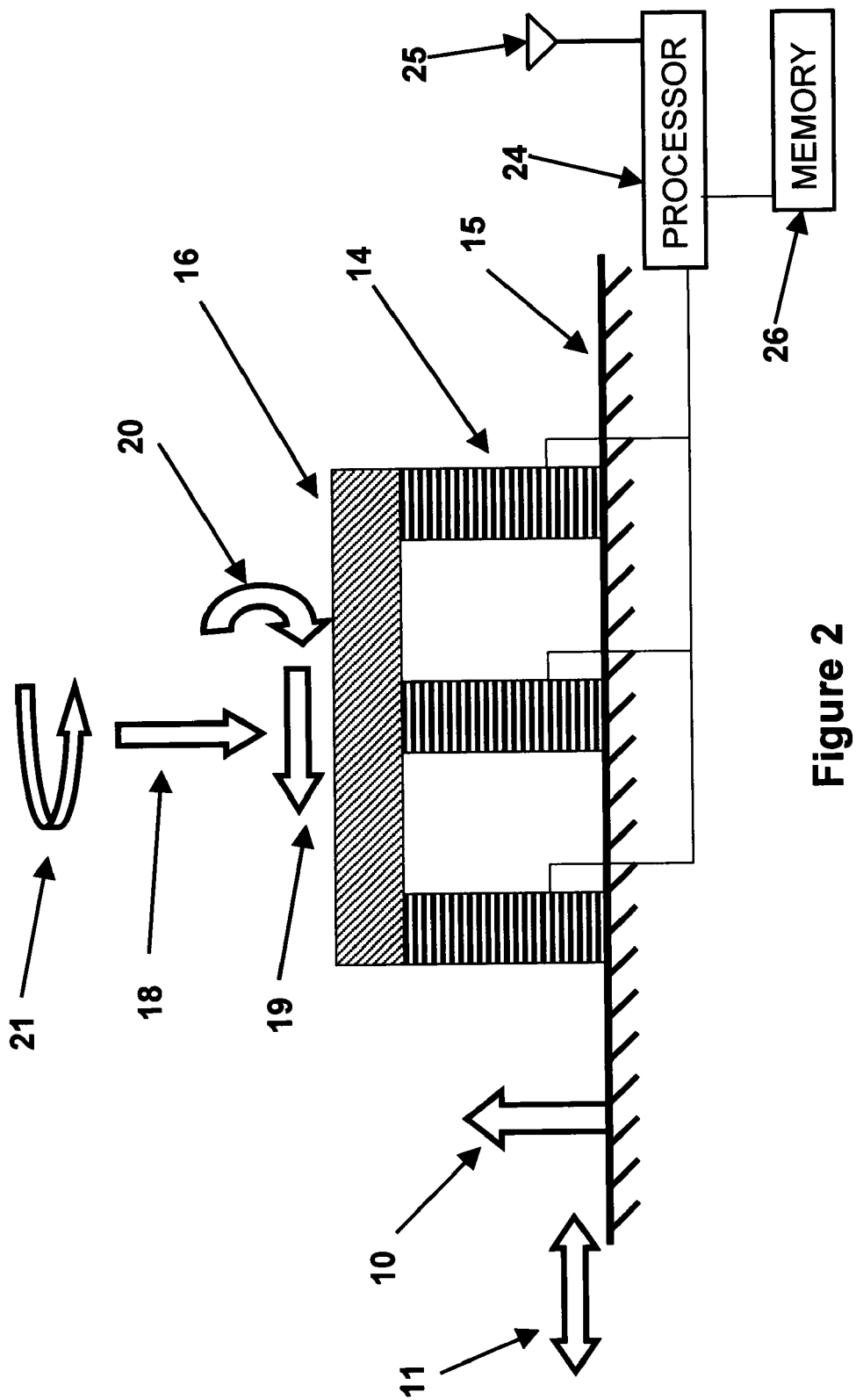
FIG. 2 is a view showing piezoelectric stacks used to convert mechanical energy to electrical energy as well as act as force/moment and torque measuring sensors together with an intermediate spring attachment element.

In the schematic of FIG. 2, the aforementioned spring element 13 forces 18 and 19, moments 20 and torque 21 are transmitted to the intermediate element 16 and by the intermediate element 16 to the at least one piezoelectric element 14 is shown again. The intermediate element 16 can be consist of a single relatively rigid component as shown in FIGS. 1 and 2, so that it would not add additional dynamics to the integrated power source and sensor device 5. In addition, the intermediate element 16 can be integral to the spring element 13 as discussed above. It is, however, appreciated by those skilled in the art that the intermediate element 16 may also consist of more than one single element.

In FIG. 2, the axial force 18, the shear forces 19 (one in the direction of the arrow 19 and one perpendicular to the directions of the arrows 18 and 19—not shown), the bending moments 20 (one in the direction of the arrow 20 and one about the direction of the arrow 19—not shown) and the torque 21 are the forces and moments and toque that are transmitted from the spring element 13 to the intermediate element 16, FIGS. 1 and 2. The forces 18 and 19, the moments 20 and the torque 21 are in turn transmitted to the piezoelectric elements 14, FIGS. 1 and 2, assuming that the intermediate element 16 has no inertia. In practice, however, the intermediate element 16 cannot be made with zero inertia; therefore the inertia of the element 16 would generally cause the level of forces 18 and 19, the moments 20 and torque 21 to be increased. In fact, the mass and moments of inertia of the intermediate element 16 may be selected to selectively increase the level of one or more forces 18 and 19 and the moments 20 and torque 21 when the device 5 (FIG. 1) is subjected to certain pattern of acceleration. By doing so, one can increase the sensitivity of the device 5 to one or more forces 18 and 19 and the moments 20 and torque 21 relative to the others and significantly reduce the effects of cross-sensitivity of the device 5 for measuring the levels of the applied forces 18 and 19 and the moments 20 and torque 21, thereby the level of applied accelerations (10 and 11, FIG. 1) to the device 5.

The forces 18 and 19, the moments 20 and the torque 21 would then act on the individual piezoelectric elements 14, thereby causing them to generate electric charges proportional to one or more of the said applied forces, moments and torque. The voltages due to the generated charges may then be input to and measured at processor 24, which also determines the level of one or more of the forces 18 and 19, the moments 20 and the torque 21. Such measurements can then be output from the processor 24, such as by a wireless transmission from transmitter 25 and/or stored in an associated memory 26. Alternatively, the voltage outputs of the piezoelectric elements can be transmitted externally and such measurements can be calculated remotely, such as at a ground station. The preferred types of piezoelectric elements 14 and other sensory components to be used in the present integrated power source and inertial sensors are described below. These measurements may be made while the charges are harvested.

Noting that the said forces 18 and 19, moments 20 and torque 21 are proportional to the aforementioned linear and rotary accelerations that are experienced by the projectile, the levels of measured forces and/or moments and/or torque would also provide the levels of at least one of the related aforementioned linear and/or rotary accelerations.

Figure 3:
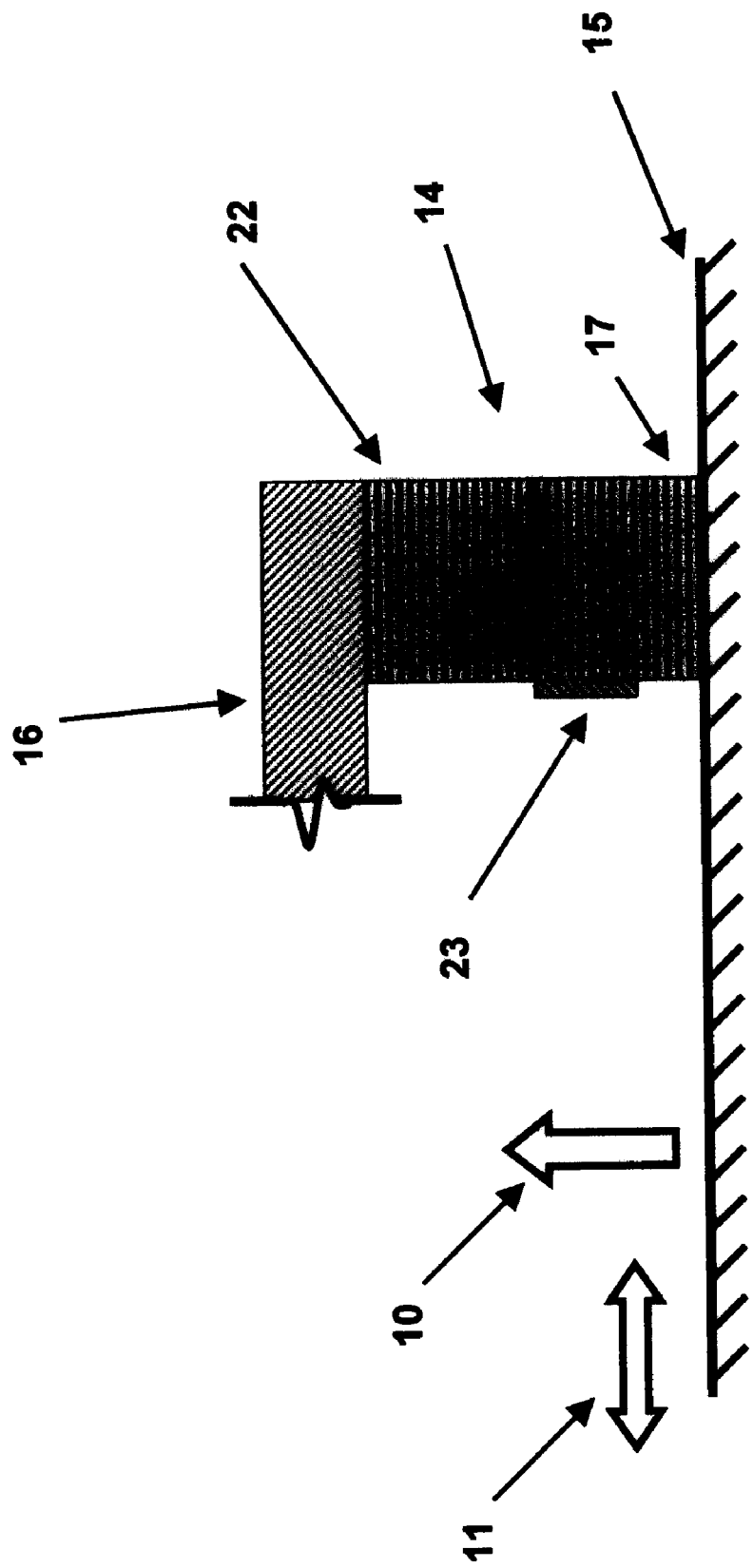
FIG. 3 shows a single piezoelectric stack element with single or multiple layers of the stack and possibly strain gages used to measure the applied forces/moments/torque due to the acceleration of the base structure to which the device is attached.

A piezoelectric element 14, FIGS. 1 and 2, which can be used in the different embodiments, is shown in detail in the schematic of FIG. 3. The piezoelectric element 14 can be a stacked type. In such stacked configurations, the piezoelectric element consists of multiple layers of relatively thin piezoelectric materials shown in FIG. 3. The layers are usually either glued or sintered together to form the stacked configuration. The layers are generally desired to be very thin and poled to generate a charge when subjected to force (i.e., strain), usually an axial force, i.e., a force in the direction perpendicular to the surface of the layers. The layers may also be poled to be sensitive to shear forces 19. Each layer is provided with electrodes that are connected in series or in parallel to provide the desired voltage to force (moment or torque) characteristics.

In one embodiment, voltage output of at least one of the layers of the piezoelectric stack 14, such as that portion of the stack positioned close to the attachment of the piezoelectric stack 14 to the projectile structure 15 and indicated with numeral 17 in FIG. 3 is used to measure the force transmitted across the piezoelectric layer. The charges generated within this layer does not have to be used for harvesting so as to increase the reliability of the force measurement. Alternatively, a piezoelectric layer closer to the intermediate element 16 such as the layer indicated with numeral 22 in FIG. 3 may be used for this purpose. In general, measurement from either layer 17 and 22 (or more layers) may also be used depending on the number of piezoelectric stacks 14 are used and the number of forces 18 and 19 and moments 20 and torque 21 that need to be measured and the cross-sensitivity of the said measurements. In general, a minimum of six independent piezoelectric layer measurements are needed to calculate the applied forces 18 and 19 and moments 20 and torque 21, thereby the corresponding acceleration of the platform 15 (FIGS. 1-3). However, more such (redundant) measurements may also be used to increase the reliability of the measurements; increase measurement precision; to reduce the effects of noise; and to reduce the aforementioned measurement cross-sensitivity.

In addition, each of the aforementioned layers that are used for force (moment and/or torque) measurement may also be configured with more than one separate electrode to act as more than one separate piezoelectric element. Two or more measurement piezoelectric layers and/or layers with separate electrodes may also be interconnected in series and/or in parallel to form various configurations designed for the resulting voltage measurements to be very sensitive to, e.g., bending moment, and less sensitive to other applied forces 18 and 19 and moments 20 and torque 21.

In another embodiment, additional types of sensors, e.g., at least one strain gage 23 attached to surface of at least one of the piezoelectric stack 14 may be used to measure strain on the surface of the piezoelectric stack 14, which is in turn related to the level of the forces 18 and 19 and moments 20 and torque 21. This measurement can then be used together with (or even without) the other aforementioned piezoelectric (preferably layer type) measurements to calculate the level of applied forces 18 and 19 and moments 20 and torque 21.

It is noted that in such force, moment and torque measurement devices, calibration to relate the levels of applied forces 18 and 19 and moments 20 and torque 21 to the aforementioned piezoelectric voltage and strain gage output levels (if strain gages are employed) can be used.

It is noted that the used of strain gage measurements to measure applied forces/moments/torques in various structures is well known in the art.

It is also appreciated by those familiar with the art that as a projectile to which structure 15 the present device 5 is attached, FIG. 1, the aforementioned axial force 18 and shear force 19 measurements can also be used to determine the direction and level of impact. The measurement of the level of impact and its duration can also be used to determined the rigidity of the surface of the target for set the fuzing parameters and the like to achieve maximum effectiveness.

Figure 4:
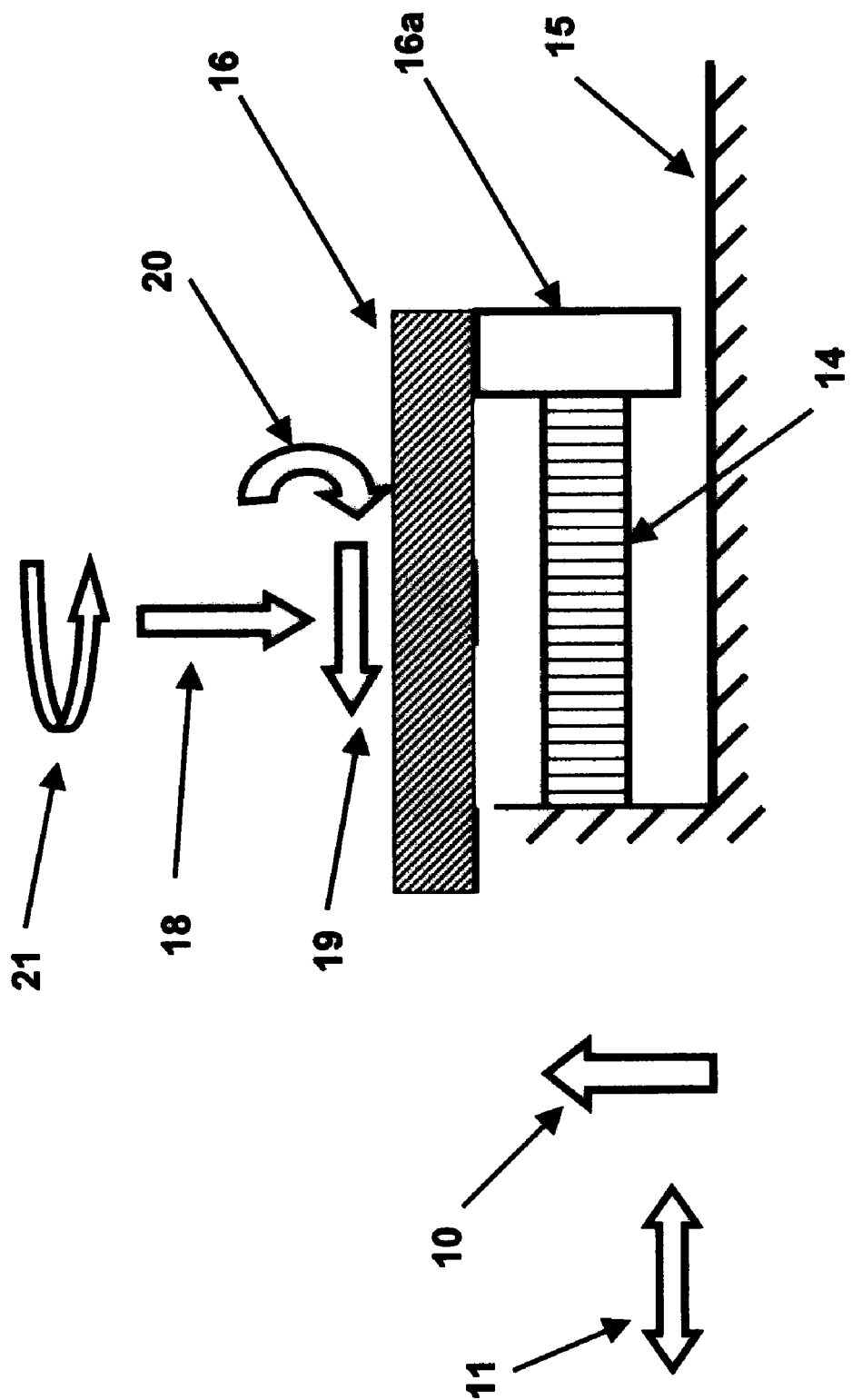
FIG. 4 illustrates an alternative configuration of the piezoelectric stacks used to convert mechanical energy to electrical energy.

FIG. 4 shows an alternative embodiment in which the piezoelectric elements 14 are configured horizontally and the intermediate element 16 has a portion 16a to sandwich the piezoelectric element 14 between the portion 16a and the base 15. Such a configuration can be used to be more sensitive to certain accelerations, such as radial acceleration 11 and torque 21. In the case of measuring the torque 21, the intermediate element 16 can twist in the direction of arrow 21. Furthermore, the device can be configured with both vertical and horizontal piezoelectric elements 14 (and/or the strain gage 23).

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device associated with an object, the device comprising:
   a mass-spring unit having a spring element and a mass disposed at one end of the spring element, the mass being free to vibrate upon an acceleration of an object;
   two or more piezoelectric stacks disposed between another end of the spring element and a portion of the object such that the mass-spring unit transmits a force resulting from the acceleration to the two or more piezoelectric stacks and converts the vibration of the mass-spring unit to an electrical energy;
   a member disposed between the mass-spring unit and two or more piezoelectric stacks to connect the three or more piezoelectric stacks and to distribute the force on the two or more piezoelectric stacks; and
   a processor for calculating at least one of the force and acceleration based on differing outputs of each of the two or more piezoelectric stacks due to the force distribution on the two or more piezoelectric stacks;
   wherein a portion of the two or more piezoelectric stacks is configured for converting the vibration of the mass-spring unit to electrical energy and another portion of the two or more piezoelectric stacks is configured to determining the at least one of the force and acceleration.

2. The device of claim 1, wherein the acceleration is one or more of a linear and rotary acceleration of the object.

3. The device of claim 1, wherein the two or more piezoelectric stacks comprises three or more piezoelectric stacks.

4. The device of claim 3, wherein the force is one or more of a force, moment and torque applied from the mass-spring unit to the three or more piezoelectric stacks.

5. The device of claim 3, further comprising harvesting the electrical energy generated from the three or more piezoelectric stacks for use with another device.

6. The device of claim 3, wherein the three or more piezoelectric stacks comprises three piezoelectric stacks.

7. The device of claim 3, wherein the three or more piezoelectric stacks are configured horizontally with regard to a base of the object.

8. The device of claim 3, wherein the three or more piezoelectric stacks are configured vertically with regard to a base of the object.

9. The device of claim 3, further comprising one or more strain gages for measuring a strain on a surface of the three or more piezoelectric stacks and wherein the processor further calculates the force and acceleration based on an output of the strain gage.

10. A device associated with an object, the device comprising:
   a mass-spring unit having a spring element and a mass disposed at one end of the spring element, the mass being free to vibrate upon an acceleration of an object;
   one or more piezoelectric elements disposed between another end of the spring element and a portion of the object such that the mass-spring unit transmits a force resulting from the acceleration to the one or more piezoelectric elements and converts the vibration of the mass-spring unit to an electrical energy; and
   a processor for calculating at least one of the force and acceleration based on an output of the one or more piezoelectric elements;
   wherein a portion of the one or more piezoelectric elements is configured for converting the vibration of the mass-spring unit to electrical energy and another portion of the one or more piezoelectric elements is configured to determining the at least one of the force and acceleration.

11. A method for generating electrical power from an acceleration of an object, the method comprising:
   vibrating a mass-spring unit upon an acceleration of an object;
   transmitting a force resulting from the acceleration from the mass-spring unit to one or more piezoelectric elements;
   converting the vibration of the mass-spring unit to an electrical energy;
   calculating at least one of the force and acceleration based on an output of the one or more piezoelectric elements; and
   configuring a portion of the one or more piezoelectric elements for converting the vibration of the mass-spring unit to electrical energy and another portion of the one or more piezoelectric elements for determining the at least one of the force and acceleration.

* * * * *